US010341643B2

(12) United States Patent
Routhier et al.

(10) Patent No.: US 10,341,643 B2
(45) Date of Patent: Jul. 2, 2019

(54) PROCESS AND SYSTEM FOR ENCODING AND PLAYBACK OF STEREOSCOPIC VIDEO SEQUENCES

(71) Applicant: 3DN, LLC, Ottawa (CA)

(72) Inventors: Nicholas Routhier, Candiac (CA); Claude Thibeault, Brossard (CA); Jean Belzile, Lachine (CA); Daniel Malouin, Longueuil (CA); Pierre-Paul Carpentier, St-Tite (CA); Martin Dallaire, Candiac (CA)

(73) Assignee: 3DN, LLC, Ottawa (CA)

( * ) Notice: Subject to any disclaimer, the term of this patent is extended or adjusted under 35 U.S.C. 154(b) by 246 days.

(21) Appl. No.: 15/332,772

(22) Filed: Oct. 24, 2016

(65) Prior Publication Data

US 2017/0041595 A1 Feb. 9, 2017

Related U.S. Application Data

(63) Continuation of application No. 14/455,042, filed on Aug. 8, 2014, now Pat. No. 9,479,755, which is a (Continued)

(30) Foreign Application Priority Data

Apr. 9, 2002 (CA) ..................................... 2380105

(51) Int. Cl.
*H04N 7/12* (2006.01)
*H04N 13/344* (2018.01)
(Continued)

(52) U.S. Cl.
CPC ............. *H04N 13/344* (2018.05); *G06T 7/20* (2013.01); *H04N 13/139* (2018.05);
(Continued)

(58) Field of Classification Search
CPC .... G06K 9/3241; G02B 27/017; G06F 3/147; G09G 3/003; H04N 13/341; H04N 13/344
(Continued)

(56) References Cited

U.S. PATENT DOCUMENTS 4,025,950 A 5/1977 Matsumoto et al.
4,562,463 A 12/1985 Lipton
(Continued)

FOREIGN PATENT DOCUMENTS

CN 1367611 9/2002
EP 0 655 869 5/1995
(Continued)

OTHER PUBLICATIONS

Chinese patent application No. 201110043036.4 final rejection dated Oct. 10, 2012 with related claims.
(Continued)

*Primary Examiner* — Gims S Philippe
(74) *Attorney, Agent, or Firm* — Volpe and Koenig, P.C.

(57) ABSTRACT

A method for decoding a compressed image stream, the image stream having a plurality of frames, each frame consisting of a merged image including pixels from a left image and pixels from a right image. The method involves the steps of receiving each merged image; changing a clock domain from the original input signal to an internal domain; for each merged image, placing at least two adjacent pixels into an input buffer and interpolating an intermediate pixel, for forming a reconstructed left frame and a reconstructed right frame according to provenance of the adjacent pixels; and reconstructing a stereoscopic image stream from the left and right image frames. The invention also teaches a system for decoding a compressed image stream.

20 Claims, 8 Drawing Sheets

Related U.S. Application Data continuation of application No. 12/406,078, filed on Mar. 17, 2009, now Pat. No. 8,804,842, which is a continuation of application No. 10/409,073, filed on Apr. 9, 2003, now Pat. No. 7,580,463.

(51) Int. Cl.

| | | |
|---|---|---|
| *H04N 13/139* | (2018.01) | |
| *H04N 13/144* | (2018.01) | |
| *H04N 13/161* | (2018.01) | |
| *H04N 13/167* | (2018.01) | |
| *H04N 13/189* | (2018.01) | |
| *H04N 13/339* | (2018.01) | |
| *H04N 13/341* | (2018.01) | |
| *H04N 13/398* | (2018.01) | |
| *H04N 19/597* | (2014.01) | |
| *G06T 7/20* | (2017.01) | |
| *H04N 13/00* | (2018.01) | |

(52) U.S. Cl.
CPC ......... *H04N 13/144* (2018.05); *H04N 13/161* (2018.05); *H04N 13/167* (2018.05); *H04N 13/189* (2018.05); *H04N 13/339* (2018.05); *H04N 13/341* (2018.05); *H04N 13/398* (2018.05); *H04N 19/597* (2014.11); *G06T 2200/04* (2013.01); *H04N 2013/0096* (2013.01); *H04N 2213/002* (2013.01); *H04N 2213/007* (2013.01)

(58) Field of Classification Search
USPC ............... 375/240.19; 345/6, 7, 102; 348/56
See application file for complete search history.

(56) References Cited

U.S. PATENT DOCUMENTS

| | | | |
|---|---|---|---|
| 4,658,291 A | 4/1987 | Morishita | |
| 4,704,627 A | 11/1987 | Yuyama et al. | |
| 4,772,944 A | 9/1988 | Yoshimura | |
| 4,884,131 A | 11/1989 | Chevion et al. | |
| 4,884,138 A | 11/1989 | Storey | |
| 4,998,167 A | 3/1991 | Jaqua | |
| 5,043,806 A | 8/1991 | Choquet et al. | |
| 5,128,754 A | 7/1992 | Dhein | |
| 5,128,759 A | 7/1992 | Matsunaga | |
| 5,159,453 A | 10/1992 | Dhein et al. | |
| 5,193,000 A | 3/1993 | Lipton et al. | |
| 5,262,854 A | 11/1993 | Ng | |
| 5,301,018 A | 4/1994 | Smidth et al. | |
| 5,416,510 A | 5/1995 | Lipton et al. | |
| 5,510,832 A * | 4/1996 | Garcia ................. H04N 13/341 348/56 |
| 5,596,321 A | 1/1997 | Hekstra et al. | |
| 5,619,230 A | 4/1997 | Edgar | |
| 5,633,682 A | 5/1997 | Tahara | |
| 5,767,898 A | 6/1998 | Urano et al. | |
| 5,786,848 A | 7/1998 | Isobe et al. | |
| 5,796,373 A * | 8/1998 | Ming-Yen .............. G09G 3/003 345/6 |
| 5,860,912 A | 1/1999 | Chiba | |
| 5,870,137 A | 2/1999 | Stuettler | |
| 5,907,364 A | 5/1999 | Furuhata et al. | |
| 5,933,547 A | 8/1999 | Dudon et al. | |
| 6,031,538 A | 2/2000 | Chupeau et al. | |
| 6,043,838 A | 3/2000 | Chen | |
| 6,055,012 A | 4/2000 | Haskell et al. | |
| 6,055,274 A | 4/2000 | McVeigh | |
| 6,075,905 A | 6/2000 | Herman et al. | |
| 6,078,352 A | 6/2000 | Nakaya et al. | |
| 6,163,337 A | 12/2000 | Azuma et al. | |
| 6,192,079 B1 | 2/2001 | Sharma | |
| 6,195,205 B1 | 2/2001 | Faris | |
| 6,269,175 B1 | 7/2001 | Hanna et al. | |
| 6,275,253 B1 | 8/2001 | Melen | |
| 6,285,368 B1 | 9/2001 | Sudo | |
| 6,518,939 B1 * | 2/2003 | Kikuchi .................. G06F 3/147 345/7 |
| 6,618,437 B1 | 9/2003 | Yamamoto | |
| 6,630,914 B1 * | 10/2003 | Tamekuni ............. G02B 27/017 345/102 |
| 6,704,042 B2 | 3/2004 | Matsui et al. | |
| 6,765,568 B2 | 7/2004 | Swift et al. | |
| 6,829,384 B2 * | 12/2004 | Schneiderman ..... G06K 9/3241 375/240.19 |
| 6,831,650 B2 | 12/2004 | Champion et al. | |
| 6,907,076 B2 | 6/2005 | Adelaide et al. | |
| 7,015,954 B1 | 3/2006 | Foote et al. | |
| 7,177,485 B2 | 2/2007 | Bacarella et al. | |
| 7,180,554 B2 | 2/2007 | Divelbliss et al. | |
| 7,212,662 B2 | 5/2007 | Mossakowsk | |
| 7,262,806 B2 | 8/2007 | MacInnis et al. | |
| 7,319,720 B2 | 1/2008 | Abrams, Jr. | |
| 7,529,400 B2 | 5/2009 | Katata et al. | |
| 7,580,463 B2 | 8/2009 | Routhier et al. | |
| 7,634,009 B2 | 12/2009 | Kutka | |
| 7,693,221 B2 | 4/2010 | Routhier et al. | |
| 7,844,001 B2 | 11/2010 | Routhier et al. | |
| 8,165,458 B2 | 4/2012 | Leichsenring et al. | |
| 2003/0053797 A1 | 3/2003 | Oshima | |
| 2003/0095177 A1 | 5/2003 | Yun | |
| 2003/0118109 A1 | 6/2003 | Kelly et al. | |
| 2003/0128273 A1 | 7/2003 | Matsui et al. | |
| 2004/0066846 A1 | 4/2004 | Yun | |
| 2004/0104935 A1 | 6/2004 | Williamson | |
| 2008/0303896 A1 | 12/2008 | Lipton et al. | |
| 2009/0066785 A1 | 3/2009 | Lee | |
| 2009/0195640 A1 | 8/2009 | Kim et al. | |
| 2009/0219382 A1 | 9/2009 | Routhier et al. | |
| 2009/0219437 A1 | 9/2009 | Baugher et al. | |
| 2011/0122230 A1 | 5/2011 | Boisson et al. | |

FOREIGN PATENT DOCUMENTS

| | | |
|---|---|---|
| EP | 0 830 034 | 9/1997 |
| EP | 1 024 672 | 9/1998 |
| JP | 06-169475 | 6/1994 |
| JP | 07-222147 | 8/1995 |
| JP | 09-065374 | 3/1997 |
| JP | 09-271042 | 10/1997 |
| JP | 10-257526 | 9/1998 |
| JP | 10-336700 | 12/1998 |
| JP | 11-018111 | 1/1999 |
| JP | 11-075223 | 3/1999 |
| JP | 2002-125246 | 4/2002 |
| JP | 3443293 | 9/2003 |
| WO | 94/21086 | 9/1994 |
| WO | 97/43863 | 11/1997 |
| WO | 01/011556 | 2/2001 |
| WO | 10/011556 | 1/2010 |

OTHER PUBLICATIONS

Chinese patent application No. 201110043036.4 notice of Re-Exam dated May 6, 2015 with related claims.
Computer Technologies for 3D Video Delivery for Home Entertainment, Atanas Gotchev, International Conference on Computer Systems and Technologies—CompSysTech'08, 2008.
Dinstein and M. Kim. Compression of stereo images using subsampling and transform coding.Optical Engineering, 30 (9):1359-1363, Sep. 1991.
English translation of German Patent 19619598.
European patent application No. 09159209.7 examination report 1 dated Mar. 25, 2010 with related claims.
European patent application No. 09159209.7 examination report 2 dated Dec. 27, 2011 with related claims.
European patent application No. 09159209.7 examination report 3 dated Mar. 22, 2013 with related claims.
European patent application No. 09159209.7 examination report 4 dated Jul. 3, 2013 with related claims.

(56) References Cited

OTHER PUBLICATIONS

European patent application No. 10158653.5 examination report 1 dated Jun. 25, 2010 with related claims.
European patent application No. 10158653.5 examination report 2 dated Dec. 21, 2011 with related claims.
European patent application No. 10158653.5 examination report 3 dated Mar. 22, 3013 with related claims.
European patent application No. 10158653.5 examination report 4 dated Jun. 20, 2013 with related claims.
European patent application No. 10158653.5 examination report 5 dated Jul. 18, 2013 with related claims.
European patent application No. 10158655.0 examination report 1 dated Jun. 25, 2010 with related claims.
European patent application No. 10158655.0 examination report 2 dated Dec. 21, 2011 with related claims.
European patent application No. 10158655.0 examination report 3 dated Mar. 22, 3013 with related claims.
European patent application No. 10158655.0 examination report 4 dated Jul. 4, 2013 with related claims.
European Search Report for European patent application No. 10158655.0.
Examination Report of EP application 10 158 653.5 dated Mar. 22, 2013 with related claims 1-14.
Fehn, C., Kauff, P., Cho, S., Kwon, H., Hur, N., and Kim, J., Asymmetric coding of stereoscopic video for transmission over T-DMB. In: Proceedings of 3D TV Conference, pp. 93-104. May 2007.
First examination report for European patent Application No. 09159209.7.
First office action for Canadian patent application No. 2,481,423, dated Sep. 1, 2010 with related claims, CA00.
First office action for Chinese patent application No. 03808028.1.
First office action for Chinese patent application No. 201110043036.4 dated Dec. 7, 2011 with related claims.
First office action for Japan application 2013-040017 dated Dec. 17, 2013 with related claims 1-7.
First office action for Japanese patent application No. 2003-585449 dated Feb. 17, 2009.
First office action for U.S. Appl. No. 10/409,073.
First office action for U.S. Appl. No. 10/960,058.
Fourth office action for U.S. Appl. No. 10/409,073.
IEEE Transactions on Circuits and Systems for Video Technology, vol. 9, No. 1, Feb. 1999, Spatiotemporal Spectral Coding of Stereo Image Sequences, Francoys Labonte et al.
International Preliminary Examination Report for PCT/CA03/00524.
International Search Report for PCT/CA03/00524.
ISO/IEC 14496-10:2009/FDAM, Information technology—Coding of audio-visual objects—Part 10: Advanced Video Coding, Amendment 1: Constrained baseline profile, stereo high profile and frame packing arrangement SEI message, ISO/IEC JTC 1/SC 29, Nov. 30, 2009, published by ISO/IEC.
Office Action for Indian patent application No. 2011/CHENP/2004 dated Jul. 16, 2009 with related claims.
Office Action for U.S. Appl. No. 12/406,078, dated Aug. 27, 2012.
Office Action for U.S. Appl. No. 12/691,786.
Office Action for U.S. Appl. No. 12/955,140.
Office Action of JP patent application No. 2010-044392, dated Sep. 4, 2012 with claims 1-17.
Patent Abstracts of Japan, vol. 096, No. 007, Jul. 31, 1996 & JP 08 070475 A (Sanyo Electric Co Ltd.) Mar. 12, 1996.
Response to Examination Report of EP application 10 158 653.5 filed on May 17, 2013 with amended claims 1-14.
Search Report for European patent application No. 10158653.5.
Second Examination Report for European Patent Application No. 09 159 209.7.
Second office action for Canadian patent application No. 2,481,423, dated Aug. 24, 2011 with related claims, CA00.
Second office action for Chinese patent application No. 03808028.1.
Second office action for Japanese patent application No. 2003-585449 dated Nov. 27, 2009.
Second office action for U.S. Appl. No. 10/409,073.
Second office action for U.S. Appl. No. 10/960,058.
Temporal and Spatial Scaling for Stereoscopic Video Compression, Anil Aksay et al., EUSIPCO 2006, Florence, Italy, Sep. 2006.
Third office action for Japanese patent application No. 2003-585449 dated Feb. 6, 2012.
Third office action for U.S. Appl. No. 10/409,073.

\* cited by examiner

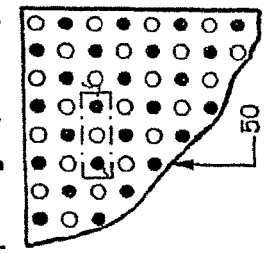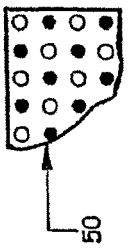
Separation
FIG. 2a
Decimation
FIG. 2b

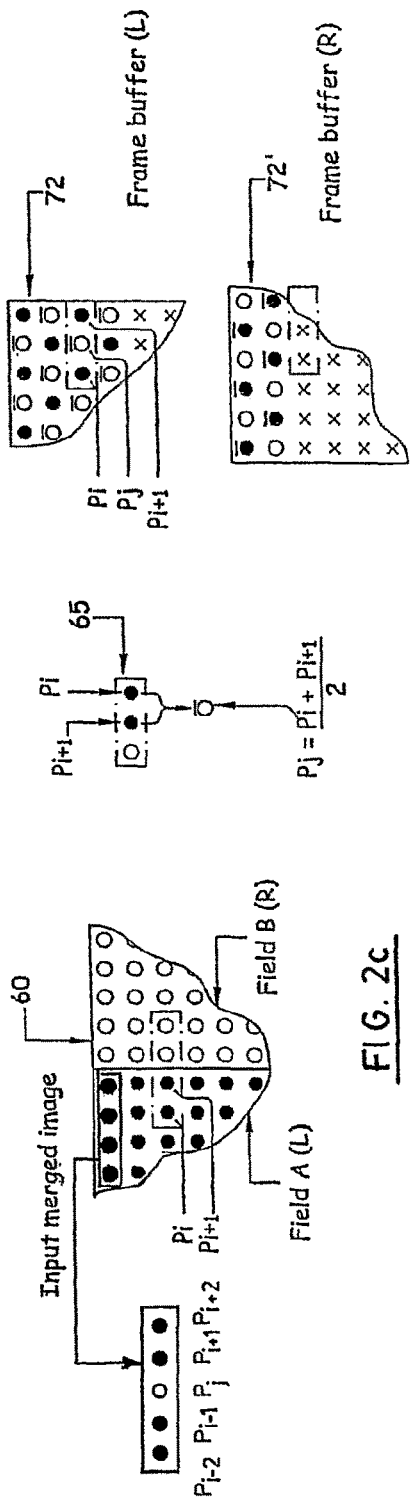
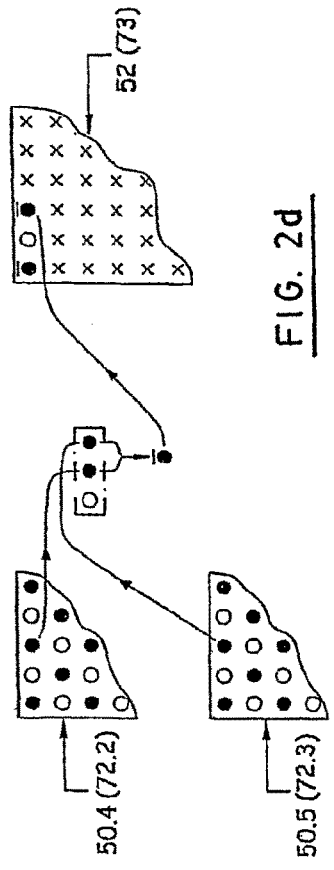
Spatial interpolation
FIG. 2c
Time interpolation
FIG. 2d

PROCESS AND SYSTEM FOR ENCODING AND PLAYBACK OF STEREOSCOPIC VIDEO SEQUENCES

FIELD OF THE INVENTION

The present invention relates generally to a process and system for encoding and decoding a dual program image sequence, and, more particularly, to a process and system for compressing two image sequence signals on a single video signal and decoding said single video signal to reproduce two image sequence programs or a three-dimensional stereoscopic program in multiple viewing formats. Although the invention will be described hereinafter by reference to processing of three-dimensional stereoscopic programs such as movies, it should be deemed to be within the scope of the present invention to apply to the processing of any pair of video sequences, regardless of any differences in the respective video content of each sequence. It should be understood that the expressions "decoding" and "decompressing" are used interchangeably within the present description, as are the expressions "encoding" and "compressing".

BRIEF DESCRIPTION OF THE PRIOR ART

Since the invention of the stereoscope in 1947, several systems have been developed to enable a viewer to view three-dimensional (3D) programs through the reproduction of a first image sequence intended for viewing by the viewer's left eye and a second sequence of images of the same scene and at the same time but with a parallax with respect to the first image sequence, intended to be viewed exclusively by the viewer's right eye, thereby replicating the principles of natural three-dimensional vision. Since the 1950s, many films have been made using dual camera head systems to pick up stereo pairs of images in time-synchronism and with a parallax to enable a viewer at reproduction to perceive the effect of depth, so to provide a more complete and exciting viewing experience.

At present, home theatre systems are rapidly penetrating the household market and very sophisticated and high quality systems are gaining in popularity, responding to a need for a high quality cinematographic experience at home. Nevertheless, existing stereoscopic reproduction systems are still far from fulfilling the expectations of viewers and are still not integrated into even the most advanced home theatre systems available. The reason mostly lies on the relatively poor image quality (fade colours and/or stair-stepping diagonals) and the fatigue and discomfort caused by the usual flicking and lack of spatial realism Indeed, since two different programs are being presented with equipment intended for single video program presentation, such as a television set, sharing of the technical resources between two video signals leads to loss of image spatial resolution and flicking due to the reduction by half of the frame presentation rate for each eye and contrast between image fields and a black background.

A typical existing stereoscopic reproduction technology consists in encoding the first image sequence information in the even line field of an interlaced video signal and the information of the second image sequence in the odd line field of the signal. At playback, shutter spectacles are used to block one of the viewer's eyes during presentation of the even lines and the other eye during presentation of the odd lines. As normal images comprising even and odd lines are typically presented in two successive scan periods of $\frac{1}{60}$s, each eye sees the stereoscopic program as a sequence of $\frac{1}{60}$s images followed by $\frac{1}{60}$s blackout periods, to enable each eye to view 30 frames per second (fps). Moreover, each reproduced image is constituted by alternating image lines and black lines. Obviously, the stereoscopic images so reproduced lose half of their topological information and the 50% duty cycles (both in space and in time) induce loss of brightness and flicking, as confirmed by experience.

A solution to such limitations, shortcomings and drawbacks, is to present complete stereoscopic images at a rate of at least 60 fps (30 full frames per second per eye), which would normally require at least twice the signal bandwidth required by a non-stereo (planar) program. Elimination of flicking in a room presenting relatively high contrast between the displayed pictures and ambient lighting, further requires a vertical scan (and shutter spectacle) frequency of up to 120 Hz, to enable presentation of up to 60 full definition images per second to each eye. While such a frequency is not widely available, flickerless presentation of stereoscopic program can be set up by using two digital video projectors of current manufacture, receiving respectively a first and a second image sequence of the stereoscopic program at a continuous rate of 30 fps each. The output of each projector is optically filtered to produce a vertically and a horizontally polarized output projecting images in register and in perfect time synchronism on a special silver coated screen. Eyewear comprising differently polarized glasses can be worn by a viewer to reveal the three-dimensional effects. Such a solution is obviously very expensive and does not meet market expectations for a home theatre system.

However, very fast and relatively affordable projectors using the DLP (Digital Light Processing) technology are now available that could provide a presentation rate up to 120 fps, so that a single projector could alternatively present images of stereo pair sequences at a sufficiently high rate to substantially eliminate flicking even in a high contrast environment Also, high-end CRT projectors and computer monitors could provide such a compatible definition and refresh rate.

Nevertheless, a major limitation of such systems remains that most current standards for storage and broadcast (transport) of video program information limit the flow of full frame images to 30 fps, which is approximately half of the capacity required to store and present a high quality stereoscopic program originally comprised of two 24 (American Motion Picture), 25 (PAL or SECAM) or 30 fps (NTSC Video) programs. Furthermore, since motion picture movies are always captured and recorded at a rate of 24 frames per second, the dual problem of compressing two 24 fps programs into a single 30 fps signal and thereafter expanding such a signal to present the two programs at a rate of 30 to 60 fps each must be addressed. Therefore, the future of the 3D home theatre lies on the capacity to encode and decode a stereoscopic video signal to comply with standard recorders, players and broadcast equipment of present manufacture treating a 30 fps signal compressed and decompressed using a protocol such as MPEG-1 or MPEG-2 (Moving Picture Image Coding Group) compression/decompression protocol of the MAIN profile (vs MVP), so that negligible loss of information or distortion is induced throughout the process.

A few technologies of the prior art have taught solutions to overcome one or more of the above-mentioned shortcomings and limitations. Firstly, the 3:2 pull-down compression method can be used to create a 30 fps stereoscopic interlaced signal from a 24 fps interlaced picture sequence. With this method the original image sequence is time-expanded by creating and inserting one new picture after every four pictures of the original sequence. The new picture comprises the even lines of the preceding picture in one field and the odd lines of the next picture in its second field. Obviously, each picture of the original program may be comprised of a first field comprising a portion of a left view image and a second field comprising a portion of a right view image of a stereoscopic program. A 30 fps stereoscopic program can thereby be obtained from a 24 fps left eye sequence and a 24 fps right eye sequence. With such a technique however, the resulting 30 fps program presents anachronism and topological distortion due to the combination in certain pictures of lines belonging to images captured at different times. This yields a poor result, lacking in realism and causing eye fatigue and discomfort to the viewer. When used to present a stereoscopic program, this technique further suffers from the same limitations and drawbacks as discussed hereinabove about the interlaced signal compression technique.

Furthermore, many stereoscopic display devices have been developed using different input signals incompatible with one another and requiring different transport (storage or distribution) formats (column interleaved, row interleaved, simultaneous dual presentation, page flipping, anaglyphic, etc.). A solution to bring a stereoscopic video program to different systems at the same time while allowing for 2D viewing would be to simultaneously broadcast or store on several physical media in all the existing formats. Obviously, that would neither be practical nor economical. Therefore, the future of stereoscopic video at home requires a stereoscopic video signal and a video processing apparatus that have the ability to generate multiple/universal stereoscopic output formats compatible with current and future stereoscopic display devices while allowing for normal 2D viewing.

Many patents also teach compression techniques to reduce two 30 fps signals to be carried through a single channel with a 30 fps capacity, some of them being designed to be transparent for the MPEG compression/decompression process. However, these techniques do not feature temporal interpolation as needed to create the missing frames to convert for instance a 24 fps sequence to 30 fps, or to convert a 30 fps sequence to a 48, 60, 72, 96 or 120 fps sequence, while preserving image quality and providing a comfortable viewing experience. Furthermore, they do not have the ability to generate multiple stereoscopic output formats from the same video signal and video processing apparatus.

For instance, U.S. Pat. No. 5,626,582 granted to Muramoto et al. on May 6, 1997, teaches a time-based compression method in which two 30 fps video signals are digitized and stored in DRAM memory at a given clock frequency. Subsequently, the memory is read at twice that write frequency so that two samples of an original period of 1/30 can be concatenated in a 1/30 interval. However, depending on the selected sampling frequency, the final signal will either lack definition because the information of two adjacent pixels will be averaged in a single digital data (low sampling frequency and normal playback frequency), or exceed the capacity of a data storage medium such as a DVD or a broadcast channel. This invention also lacks the ability to generate multiple output formats from a given source format, and requires two parallel circuits for reconstruction of the original sequences.

Further, in International application No WO 97/43863, by Briede, laid open on Nov. 20, 1997, images from a first and a second sequence of images are decimated and pixels are redirected to form a single line with the complementary pixels of two successive original lines and then interlacing the newly created lines from the left eye and the right eye to form a combined stereo image sequence to be transmitted through a channel. At the receiving end, the juxtaposed fields are demultiplexed from the stereo image sequence and are sent to two parallel expanding circuits that simultaneously reposition the pixels and recreate the missing picture elements of their respective stereoscopic video sequence (right and left). The thereby reconstructed original first and second images sequences are then outputted to two displays for visualization.

While that technology provides an interesting method for spatially compressing/decompressing full frames, for storage or distribution using a limited capacity channel (transport medium), it does not address the problem of converting a two 24 or 25 fps image sequences into a 30 fps stereo sequence or boosting the playback rate to prevent flicking. Furthermore, it does not allow playback in other stereoscopic formats, including the page flipping mode using a single display monitor or projector through time sequencing of the rebuilt first and second image sequences. Also, as for the previous example, two parallel circuits are again required to carry out the reconstruction process on both image sequences since the signal must be originally first demultiplexed before reconstructing the images.

Although the above examples show that different methods and systems are known for the encoding of two video signals or images sequences into a single signal and for decoding such a composite signal to substantially retrieve the original signals or sequences, these methods and systems of the prior art are nevertheless lacking important features to provide a functional system which enables high fidelity recording, broadcast and playback of two 24 fps motion picture movies as well as 25 or 30 fps stereoscopic video programs, using a single channel and conventional recording, playback and display equipment of present manufacture, as required for instance to meet the expectations of the home theatre market for 3D movies reproduction.

There is thus a need for a novel stereoscopic program encoding and playback method and system which can be readily used with existing home theatre equipment to provide a high quality stereoscopic reproduction, still at an affordable cost, while enabling playback of a specific stereoscopic video transport signal in a plurality of output formats.

SUMMARY OF THE INVENTION

It is an object of the invention to provide a method for decoding an encoded image stream, said image stream comprising a plurality of frames, each frame consisting of a merged image comprising pixels from a left image and pixels from a right image, comprising the steps of:
(a) receiving each merged image;
(b) changing a clock domain from the original input signal to an internal domain;
(c) for each merged image, placing at least two adjacent pixels into an input buffer and interpolating an intermediate pixel, for forming a reconstructed left frame and a reconstructed right frame according to provenance of said adjacent pixels; and
(d) reconstructing a stereoscopic image stream from said left and right image frames.

The present invention also provides a system for decoding an encoded image stream, comprising:

(a) an input for receiving a compressed image stream;
(b) a spatial interpolation module operatively connected to said input for spatially interpolating each merged frame into a reconstructed right and left frame;
(c) an input memory controller;
(d) a right and a left memory buffer for storing said reconstructed right and left frames;
(e) an output memory controller;
(f) a rate controller;
(g) a synchronisation module for synchronising a stereoscopic display device; and
(h) an output for outputting a stream of reconstructed right and left images.

More specifically, the system and method of the present invention includes the steps of:
1—Topologically decimating first and second moving image sequences having a first display rate, into reduced mosaics to form adjacent fields of a third image sequence having a second display rate which is less than twice said first display rate;
2—Encoding and transporting said third image sequence through a data transport medium;
3—Retrieving said third image sequence from said data transport medium, and,
4—Topologically interpolating reduced image mosaics from fields of said third image sequence to substantially rebuild images of said first and second image sequences.

The process preferably comprises an additional step 5 wherein said first and second rebuilt image sequences are time sequenced to form an output image sequence comprised of successively alternating images from each of said first and second rebuilt image sequences (page flipping mode). According to alternate real time reading modes of the first and second rebuilt image sequences, output sequence format can be arranged to comply with a line interleaved, a column interleaved, an anaglyphic or a two-dimensional presentation mode.

There is further disclosed another embodiment of the process according to the present invention wherein step 4 further comprises:
Creating pairs of new images by temporal interpolation of successive images of the rebuilt first and second image sequences, and inserting one image from each of said temporally interpolated images pairs into each of said first and second rebuilt image sequences to thereby increase their display rate.

There is further disclosed another embodiment of the process according to the present invention wherein step 4 further comprises:
Repeating image pairs into said first and second rebuilt image sequences to thereby increase their display rate.

There is further disclosed another embodiment of process according to the present invention wherein, first and second moving image sequences have their display rate increased by inserting pairs of new temporally interpolated (created) or repeated (read twice) images before carrying out step I of the above process.

According to another embodiment of the present invention, said output image sequence has a normal display rate of R images per second and is comprised of 12 images per second from the first and second image sequences, 36 images per second spatially interpolated from reduced mosaics of the first and second image sequences, and R-48 inserted images. Inserted images can be repeated images or temporally interpolated images. Should R be equal to 96 images per second, said output image sequence comprises 12 images per second from the first and second image sequences, 36 images per second spatially interpolated from reduced mosaics of the first and second image sequences, each image being repeated twice.

According to a further embodiment of the present invention, said output image sequence has a normal display rate of R images per second and is comprised of 60 images per second spatially interpolated from reduced mosaics of the first and second image sequences, and R-60 inserted images. Inserted images can be repeated images or temporally interpolated images. Should R be equal to 120 images per second, said output image sequence comprises 60 spatially interpolated images repeated twice.

There is further disclosed a system according to the present invention, comprising a digital video disk player, a decoder and a video display device, wherein said decoder: inputs a signal from the video disk player representative of a sequence of images having a left field and a right field respectively representing reduced image mosaics, topologically interpolates reduced image mosaics from fields of said image sequence to form a first and second sequences of rebuilt images, creates new images by temporal interpolation of successive images of the rebuilt first and second image sequences, time sequences rebuilt images and created images to form an output image sequence comprised of successively alternating images from each of said first and second rebuilt image sequences, and, outputs signals representative of said output image sequence to said video display device.

As it will become more apparent from reading of the following detailed description, the present invention overcomes the limitations and drawbacks of the above mentioned solutions of the prior art, and amongst other advantageous features the following can be underlined:

The present invention provides an encoding method and a system implementing the method which enable the compression of two 24 or 30 fps image sequences in a format suitable for storage into a conventional digital video disk (DVD) or broadcasting using conventional equipment, and without substantially perceivable loss of spatial and temporal information.

The present invention provides a playback method and system which enable high visual quality reproduction of stereoscopic programs by reconstruction of the original sequences and rate augmentation for presentation at rates from 24 to 60 full resolution images per second per eye, in progressive or interlaced mode.

The present invention provides an encoding and playback method and system which features full compatibility with commercially available data storage medium playback equipment and display equipment, and more specifically with MPEG main view profile compression/decompression protocols and commercial circuits.

The present invention provides a stereoscopic program playback method and system which provide universal output signals which can be directly used or converted to enable reproduction with any existing technology such as head mounted displays (HMD), LCD, DLP and CRT rear and front projection TV'S, direct view TV'S and computer monitors operating under any universal standard (NTSC, PAL, SECAM, SDTV, HDTV, etc.), with shutter spectacles, polarized eyewear, or anaglyphic glasses.

The present invention provides an encoding and playback method and system which provides elimination or substantial reduction of flicking and fatigue usually encountered in viewing stereoscopic movies with the prior art methods and apparatus.

The present invention further provides a method and system which enables encoding and decoding of two independent image sequences potentially representing different and unrelated scenes.

BRIEF DESCRIPTION OF THE DRAWINGS

FIG. 1b is a schematic representation of a system according to the present invention, for expansion decoding and playback of a stereoscopic image sequence previously encoded with a system such as represented in FIG. 1a.

FIG. 2a is a schematic representation of a portion of a digitized image 60 topologically separated into two complementary mosaics of picture elements, forming fields A and B of a merged image 60.

FIG. 2b is a schematic representation of a portion of two digitized images 50 and 50', topologically decimated into reduced mosaics respectively forming field A and field B of a merged image 60.

FIG. 2c is a schematic representation of a process for the spatial interpolation of a pair of decimated images comprised in a merged image 60, to rebuild two full-definition images 72 and 72.

FIG. 2d is a schematic representation of a time-interpolation process for the creation of a new image 52 from two images 50.4 and 50.5 with a time delay.

FIG. 3b is a schematic representation of a first embodiment of a decompression process according to the present invention, for reconstruction and temporal expansion of a stereoscopic image sequence previously encoded according to a process such as represented in FIG. 3a.

FIG. 4b is a schematic representation of a second embodiment of a compression process according to the present invention, for reconstruction and temporal expansion of a stereoscopic image sequence previously encoded according to a process such as represented in FIG. 4a.

Similar reference numerals refer to similar parts throughout the various Figures.

DETAILED DESCRIPTION OF THE DRAWINGS

Preferred embodiments of the method and associated systems for encoding and playback of stereoscopic video sequences according to the present invention will now be described in detail referring to the appended drawings.

Figure 1A:
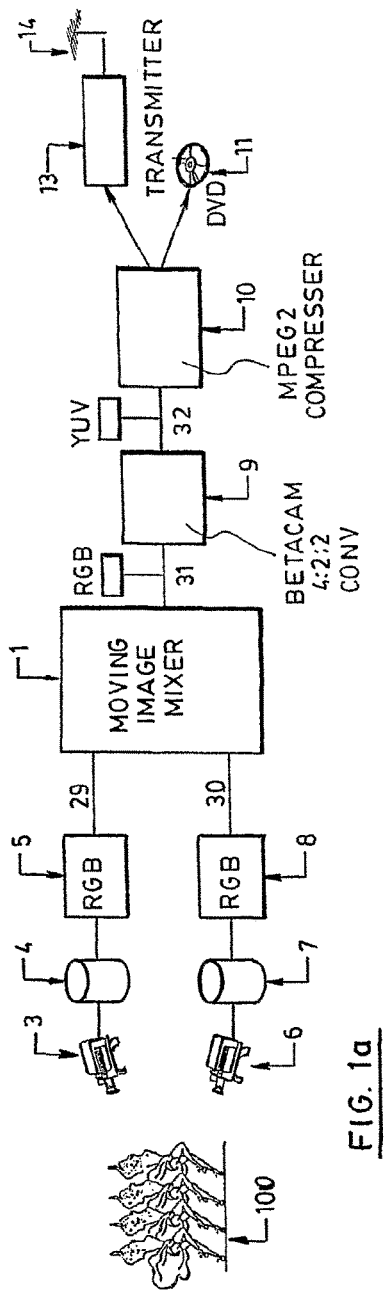
FIG. 1a is a schematic representation of a system according to the present invention for the compression encoding of two planar image sequences into a stereoscopic image sequence to be recorded onto a data storage medium or broadcast on a single channel.

Referring to FIG. 1, there is illustrated a typical system set-up according to the present invention, for the compression encoding of two planar image sequences into a stereoscopic image sequence. A first and a second source of image sequences represented by cameras 3 and 6 are stored into common or respective digital data storage media 4 and 7. Alternatively, image sequences may be provided from digitised movie films or any other source of digital picture files stored in a digital data storage medium or inputted in real time as a digital video signal suitable for reading by a microprocessor based system. Cameras 3 and 6 are shown in a position wherein their respective captured image sequences represent different views with a parallax of a scene 100, simulating the perception of a left eye and a right eye of a viewer, according to the concept of stereoscopy. Therefore, appropriate reproduction of the first and second captured image sequences would enable a viewer to perceive a three-dimensional view of scene 100.

Stored digital image sequences, typically available in a 24 fps digital Y U V format such as Betacam 4:2:2 (motion pictures), are then converted to an RGB format by processors such as 5 and 8 and fed to inputs 29 and 30 of moving image mixer unit 1, representing the main element of the encoding system of the present invention. It should be noted however the two image sequences can alternatively be converted on a time-sharing basis by a common processor, in order to reduce costs. Mixer 1 compresses the two planar RGB input signals into a 30 fps stereo RGB signal delivered at output 31 and then converted by processor 9 into a betacam 4:2:2 format at output 32 and in turn compressed into a standard MPEG2 bit stream format by a typical circuit 10. The resulting MPEG2 coded stereoscopic program can then be recorded on a conventional medium such as a Digital Video Disk (DVD) 11 or broadcasted on a single standard channel through, for example, transmitter 13 and antenna 14. Alternative program transport media could be for instance a cable distribution network or internet.

Figure 1B:
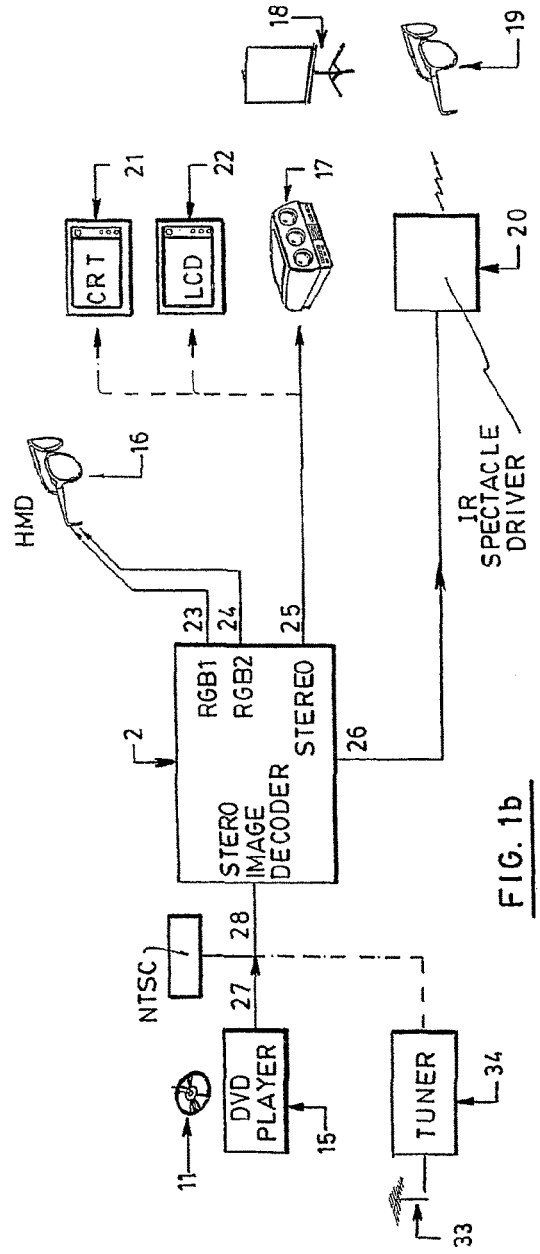

Turning now to FIG. 1b, there is illustrated a typical system according to the present invention for the decoding and playback of the stereoscopic program recorded or broadcasted using the system of FIG. 1. The stereo DVD 11 (3DVD) comprising the compressed information from the first and second images sequences, is played by a conventional player 15 of current manufacture, delivering a NTSC serial analog signal to the input 28 of the stereo image decoder 2, the main element of the decode/playback system of the present invention. Alternatively, any ATSC DTV signal in its analogue or digital format can be accepted.

Decoder 2 produces a synchronized pair of RGB signals at outputs 23 and 24, representative of the first an second image sequences, to drive a dual input stereoscopic progressive display device such as a head mounted display (HMD) 16. Further, decoder 2 produces a time-sequenced stereo RGB signal at output 25, to supply a single input progressive display device such as projector 17, LCD display 22, CRT monitor or a SDTV or HDTV 21, whereby images from the first and second image sequences are presented in an alternating page flipping mode. Alternatively, the stereo RGB signal from output 25 may be converted into an interlaced NTSC signal to be reproduced by an analog CRT television set or in other stereoscopic formats (ex: column interleaved for autostereoscopic lenticular displays). Also, decoder 2 may be so internally configured to output the stereo RGB signal at one of RGB outputs 23 or 24, thus eliminating output 25.

Decoder 2 further produces a sync-timing signal at output 26 to drive an infrared shutter spectacle driver 20, driving spectacles 19. Shutter spectacles 19 can be worn by a viewer to view a three-dimensional program projected for instance on screen 18 by projector 17 fed by stereo output 25, by enabling the viewer to alternately see an image from the first image sequence with one eye and an image from the second image sequence with his second eye.

As stated in the foregoing description, the two original image sequences contain too much information to enable direct storage onto a conventional DVD or broadcast through a conventional channel using the MPEG2 or equivalent multiplexing protocol handling information at a rate of 30 fps. Therefore mixer 1 carries out a decimation process to reduce each picture's information by half.

The spatial decimation carried out by mixer 1 will now be described with reference to FIGS. 2a and 2b.

FIG. 2a illustrates a portion of an image 50 as defined by a RGB video signal processed by mixer 1 and decoder 2. As can be seen, image 50 is comprised of a plurality of pixels (alternating full and empty dots). In the RGB format, each pixel is defined by a vector of 3 digital numbers respectively indicative of the red, green and blue intensity. The present invention makes use of a presumption that three adjacent pixels have intensities that are not drastically dissimilar, either in the horizontal direction or the vertical direction. Consequently, the present invention advantageously provides for a compression, or decimation, or separation process which reduces the size of an image by 50% without unduly corrupting the image.

In a schematic representation, FIG. 2a illustrates how this is achieved. As mentioned above, image 50 is comprised of a plurality of pixels. The series of pixels (indicated by a solid dot) starting with the first pixel of the image (pixels one of line one), followed by the third one and so forth throughout the image, from the left to the right of each row and from the upper line to the last one are placed in one half of a frame buffer, in order to make mosaic A. The remaining pixels, viz. the even-numbered pixels, (indicated by the empty dots) are placed as mosaic B. In the example of FIG. 2a, the two complementary mosaics of image 50 are shown as being respectively stored in mosaic A and mosaic B of a common merged image 60. In practice however, this "separation" is preferably automatically done with appropriate hardware and software which could, for example, only "read" the odd-numbered or even-numbered pixels and directly placed them in a frame buffer.

As better illustrated in FIG. 2b, basically, images are spatially compressed by 50% by keeping only mosaic A of images of the first sequence (ex. left eye sequence) such as 50, and mosaic B of the images of the second sequence (ex. right eye sequence) such as 50'. Keeping mosaics of different types for each sequence promotes higher fidelity at playback when first and second sequences represent different views of a same scene. Alternatively, spatial compression could be carried out by saving mosaic A for even numbered images and mosaic B for odd numbered images, for both input sequences, so that two successive images of the same eye would be rebuilt from mosaics of different types and potentially stored in the same compressed frame.

The above operation is accomplished by inputting the data of one pixel at a time in a three-pixel input buffer 55 as shown in FIG. 2b. Pixel information is then transferred into the appropriate memory location of one or more frame buffer(s), each serving to build a different merged image. Mosaics from different input images are concatenated side by side by pair to form two adjacent fields (left field and right field) of a new series of merged frames of the original size such as 60. In the example illustrated at FIG. 2b, image 50' is currently being processed, while processing of image 50 is completed, yielding a complete type A mosaic stored in the left field (A) of merged image 60. It should be pointed out however that the merged frames do not necessarily comprise an image from the first sequence and an image from the second sequence, or images captured at the same time, as will be apparent from the detailed description of preferred embodiments of the compressing/encoding (mixing) method. As a matter of fact, in the example of FIG. 2a, field A and field B of the merged image 60 are respectively filled with mosaic A and mosaic B from a same image 50. While that situation has been chosen to simplify the illustration and corresponds to an actual situation according to one of the embodiments of the invention contemplated herein, it shall be deemed that merged images such as 60 could comprise mosaics originating from any of the inputted images. That side-by-side compressed transport format is mostly transparent and unaffected by the compression/decompression processing characterizing the MPEG2 main view protocol downstream in the process.

Upon decoding of the merged images, reconstruction of the complete images is carried out by spatially interpolating missing pixels from the compressed half-size images (mosaics) located in the fields of the merged images such as 60. As illustrated in FIG. 2c, this is preferably accomplished in real time when each pixel of an input merged frame 60 decoded in decoder 2 is being transferred to or from memory. As mentioned above, the underlying premise of the system of the present invention is that values of adjacent pixels are not so dissimilar. Consequently, in order to reconstruct an image from a mosaic, adjacent pixels are weighted in order to interpolate a missing pixel.

In a preferred embodiment of the invention, data of one pixel at a time is stored into a three-pixel input buffer 65. As shown, the three pixels of the shadowed portion of input image 60 have been stored in input buffer 65, two adjacent pixels from the same mosaic being identified as $P_i$ and $P_{i+1}$. Data of a third pixel $P_j$ is then calculated as being the arithmetic mean of each of the 3 components of the RGB vectors of adjacent pixels (P and $P_{i+1}$). For example, if pixel $P_i$ has an intensity vector of (10,0,30) and pixel $P_{i+1}$ has an intensity vector of (20,0,60), then, pixel $P_j$ will be calculated as being (15,0,45). Therefore, the mean of two identical pixels is another identical pixel. That calculated (topologically interpolated) pixel replaces the missing pixel decimated upon creation of the mosaics from original image sequences such as 50.

The original pixels and the interpolated pixels are then stored in appropriate memory locations of a frame buffer where the corresponding image is to be reconstructed (image 72 in the present example). Passed the centre of each line of the merged frame 60 (entering the right field), data is stored into a second frame buffer 72', to rebuild the image from the mosaic stored in the right hand field of the stereo image. The process is followed line by line from left to right, until the two images are spatially reconstructed in their respective buffer.

Although the above embodiment interpolates a pixel as being the mean of two adjacent pixels of a mosaic, the invention provides for a weighting of more than two pixels. For example, if pixel $P_j$ is to be interpolated, then the two or three preceding and following pixels from the mosaic can be used with difference coefficients. More specifically, referring to FIG. 2c, $P_j$ can be interpolated as $0.6P_{i+1}+0.6P_{i-1}-0.1P_{i+2}-0.1P_{i-2}$. Of course a variety of different coefficients and formulae may be used according to preferred results. Furthermore, instead of performing horizontal interpolation, vertical interpolation may be performed following the same process, or a combination of both horizontal and vertical interpolation.

In order to assure flickerless viewing, the decoding method further comprises temporal expansion of image sequences as will be described in detail in the following description. When frame buffers are completely filled to provide complete rebuilt or temporally interpolated images (no more than four frame buffers are required in any embodiment of the reconstruction process and system), they may be read according to different modes to provide different types of desired output signals.

Figure 3A:
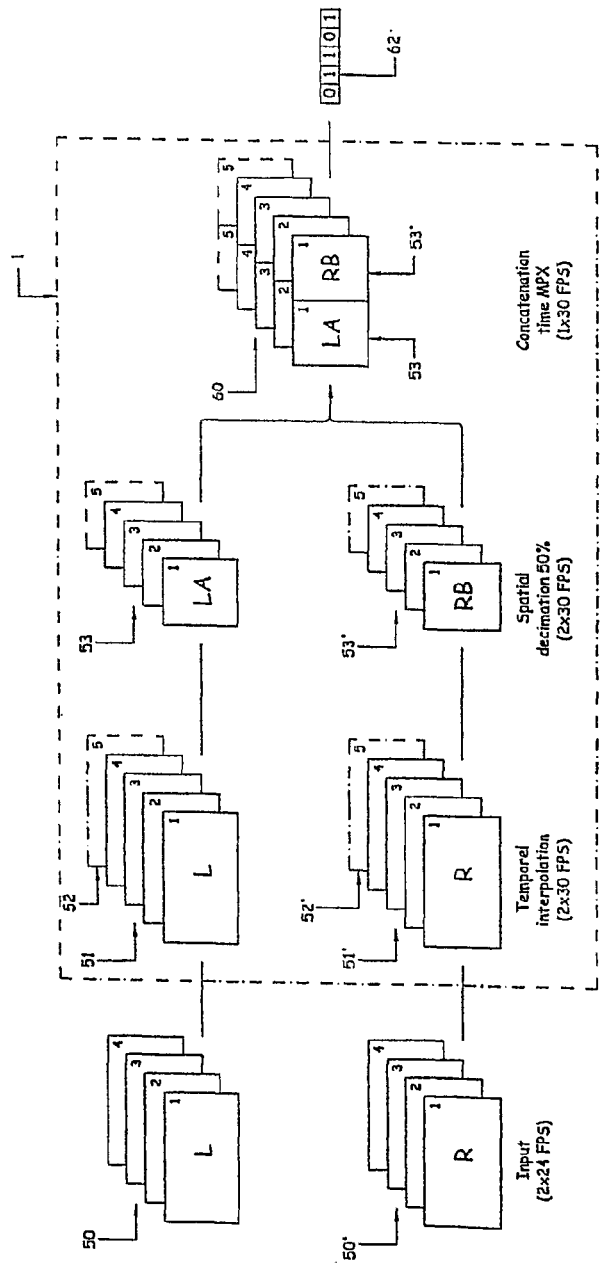
FIG. 3a is a schematic representation of a first embodiment of a compression process according to the present invention, for compression encoding two planar image sequences into a stereoscopic combined image sequence.

A first embodiment of the mixing method carried out by mixer 1 according to the present invention is schematically represented in FIG. 3*a* of the appended drawings and will now be described in detail.

A first sequence of images in RGB 24 fps format 50, identified as L1 to L4, is first time expanded by 25% to form a 30 fps sequence of images such as 51, by the creation and insertion of a new image 52 after every fourth image of the original sequence 50. New image 52 is time-interpolated from the topological information of the immediately preceding and following images (#4 and #5 of original sequence 50). Each pixel of the new image 52 is calculated as the arithmetic mean of the corresponding pixel in the precedent and following image, in a manner similar to the spatial interpolation technique explained in the foregoing description. FIG. 2*d* provides a specific illustration of the time-interpolation process where a new image 52 is created from two time-successive images 50.4 and 50.5 of input image sequence 50. Creation of new images in the present invention is generally accomplished according to that technique to provide improved fluidity at playback, as compared for instance to simple repetition of frames, which would require less processing power.

Alternatively, any known method, such as movement anticipation based methods, could be used for performing time-interpolation of images.

Images of the time-expanded sequence 51 are then spatially compressed according to the technique illustrated in FIG. 2*b* and described in detail in the foregoing description, to form mosaics represented by a new sequence 53. Similarly, the second input image sequence 50' is time expanded into the 30 fps sequence 51' and spatially compressed into mosaics represented by sequence 53'. In this specific embodiment, pairs of compressed images (mosaics) from the first sequence 53 and the second sequence 53' respectively are then concatenated to form a left field and a right field of merged images of a 30 fps RGB sequence 60. This sequence 60 can the be encoded in stream 62 for transmission to a remote location.

It is worth mentioning that in spite of the schematic diagram of FIG. 3*a*, the processing of the image sequences is preferably not carried out in parallel and with long sequences of images. Actually, only a few images are being buffered at a given time to enable temporal interpolation, and images are alternatively imported from the first and the second (left and right) sequences and processed on a pixel by pixel basis more like the process steps represented in FIGS. 2*b* and 2*d*.

The decoding and reconstruction carried out by decoder 2 according to the first embodiment of the present invention will now be described by referring to FIGS. 3*b*, 2*c* and 2*d*.

Figure 3B:
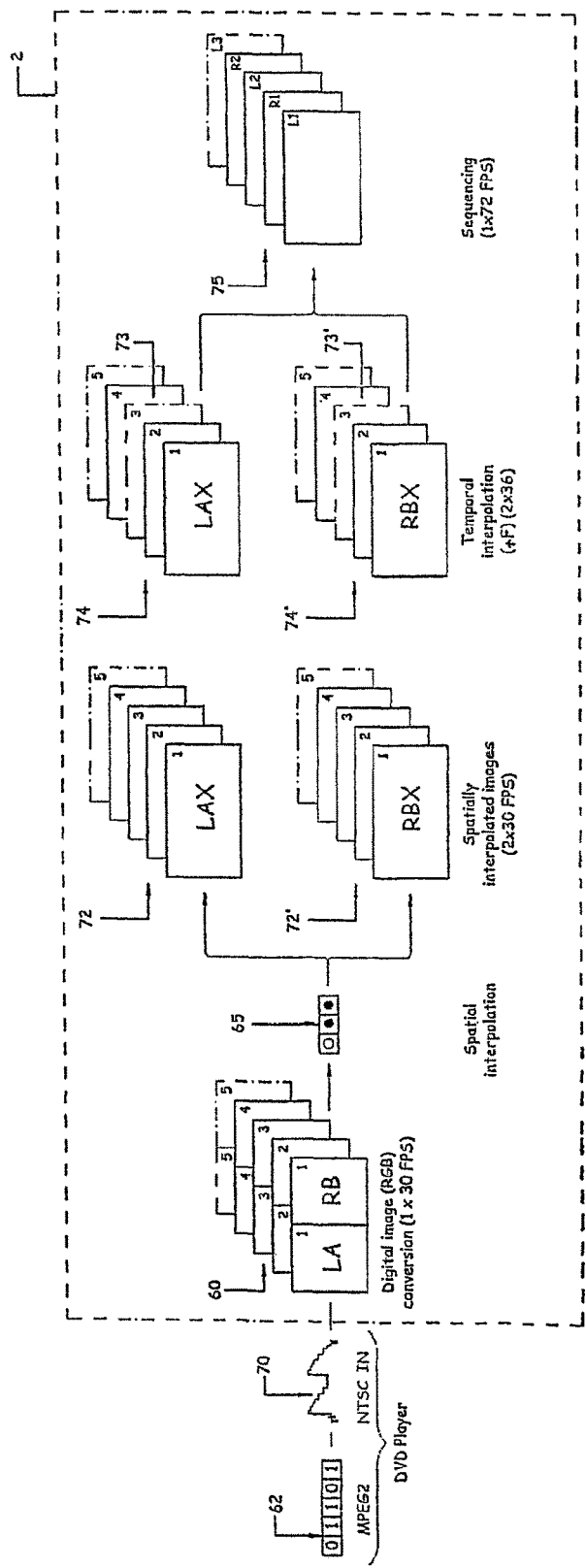

In the example shown in FIG. 3*b*, stereo MPEG signal 62 is read from a DVD and is converted by the DVD player 15 (FIG. 1*b*) into an analog NTSC signal 70 inputted by the decoder 2. NTSC signal 70 is first converted into an RGB format to recuperate merged images such as in sequence 60. Reconstruction of first and second original sequences 50, 50' can then be started by spatially interpolating and separating mosaics from the left and right fields of the merged images from sequence 60 on a pixel by pixel basis, as previously described with reference to FIG. 2*c*, to form 30 fps decompressed buffered images such as 72 and 72'. Therefore, spatial interpolation and separation are actually carried out simultaneously. Sequences of RGB images 72 and 72' could be directly outputted and displayed on a dual input device to reproduce the original programs or stereoscopic program signals at a 60 fps (30 per eye) presentation rate. Further processing could also be performed to present the image sequences in an interlaced mode or in sequence (page flipping mode), anaglyphic, column interleaved, conventional 2D mode, etc. on a plurality of existing single input display devices.

However, in order to enable comfortable and fatigue free viewing, decoder 2 significantly reduces flicking by providing output signals at a typical rate of 36 full definition frames per eye per second, while satisfying results may be obtained at 30 fps per eye with high definition frames to match refresh rates of SDTV or HDTV for instance. On the other hand, output signals up to 120 fps (60 images per second per eye) can be provided by decoder 2 for a very high fidelity reproduction, such an output being compatible however with display devices such as DLP projectors and a limited number of high end devices. By experience, a playback rate of 72 fps provides very good results, provided image quality is preserved throughout the coding/decoding process as contemplated herein, such a frequency being a standard for most display devices currently encountered in home theatre systems.

Therefore, the playback process carried out by decoder 2 preferably includes a further step to increase the presentation rate of sequences 72 and 72'. Additional images are inserted at regular intervals in the image sequence, using the temporal interpolation technique already explained in the foregoing description of the mixing process referring to FIGS. 3*a* and 2*c*. The position of insertion can be carefully controlled through the frame number information stored in blank lines of input sequence 60 at mixing. Alternatively, images from sequences 72 and 72' can be repeated (read twice) to increase the rate at presentation. For instance every image of the sequences could be read twice to double the rate of presentation.

In the example illustrated in FIG. 3*b*, one new intermediate image pair 73, 73', is time-interpolated using information from images #2 and #3 of sequences 72 and 72' respectively and inserted between images #2 and #3 to thereby increase the rate of the resulting sequences 74 and 74' to 36 fps (total of 72 fps for the stereoscopic program). The process is partly illustrated in FIG. 2*c*, where images #2 and #3 of sequence 72 are identified as 72.2 and 72.3. Alternatively, further images could be time-interpolated and inserted to provide a rate of say 48 frames per second per sequence for a total of 96 fps. A rate of 60 fps per sequence (eye) (total 120 fps for the stereoscopic program) is also an interesting case where no interpolation is required. All of the images of sequences 72 and 72' are merely duplicated to double the number of images. At playback, shutter spectacles are driven at a rate of 120 Hz and all the images of a given sequence are presented twice to the corresponding eye in ⅟30s. An unsurpassed clarity is thereby provided, but presently only a very limited range of display devices can handle such a high refresh rate.

It should be noted that the foregoing description has been based on the fact that input sequences are supplied at a rate of 24 fps, which is common for motion picture movies. However, one can easily appreciate that the mixing process can be easily adapted to the case whereby two 30 fps sequences (ex. TV programs) would be supplied, by merely skipping the preliminary step of temporal interpolation represented by time-expanded sequences 51 and 51' of FIG. 3a. Obviously, since the decoding process always operates on a 30 fps input sequence, no substantial adaptation is required to that part of the process.

Figure 4A:
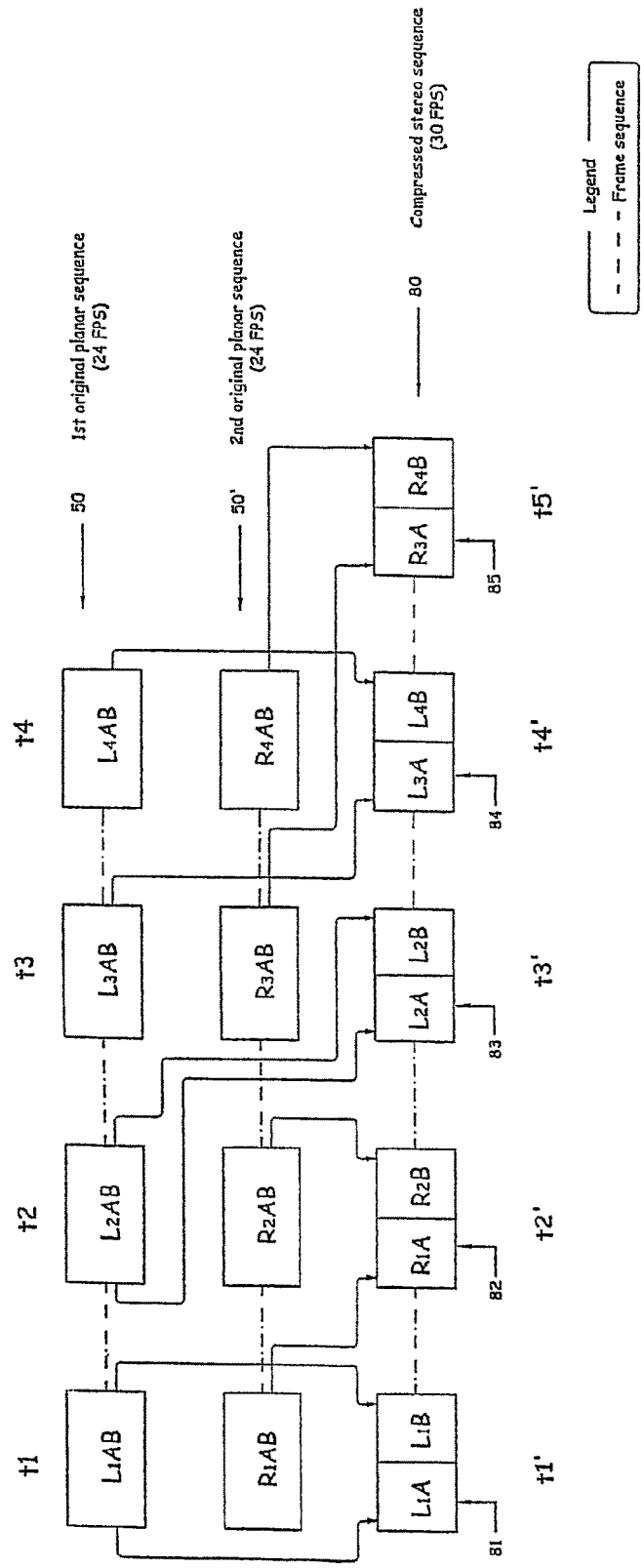
FIG. 4a is a schematic representation of a second embodiment of a compression process according to the present invention, for compression encoding two planar image sequences into a stereoscopic image sequence.

Alternatively, as illustrated in FIG. 4a, the encoding process of the present invention does not require temporal interpolation before creating the mosaics. In the example of FIG. 4a, a two 24 fps sequence is mixed to provide a 30 fps sequence by appropriately separating the frames. Since time-interpolated images may be inserted in the sequence (when input sequences comprise 24 fps), compressed sequence 80 becomes irregular. Therefore, the encoding (mixing) process according to the present embodiment of the invention further includes insertion of information in the compressed sequence 60 to enable identification of frame numbers as needed by the reconstruction process to identify image content and rebuild sequences with the proper sequential order (timing) at appropriate locations in the sequence. Such information may be stored in blank lines of merged images for instance. The usefulness of that procedure will become more apparent upon reading of the following description of the decoding process. This completes the mixing procedure per se carried out by mixer 1. Further in the process, as described in reference to FIG. 1a, RGB merged image sequence 60 (ex. AVI file) can be converted to a digital Y U V format prior to being multiplexed into an MPEG2 bit stream format or be directly converted into an MPEG2 format identified by numeral 62 in FIG. 3a.

Figure 4B:
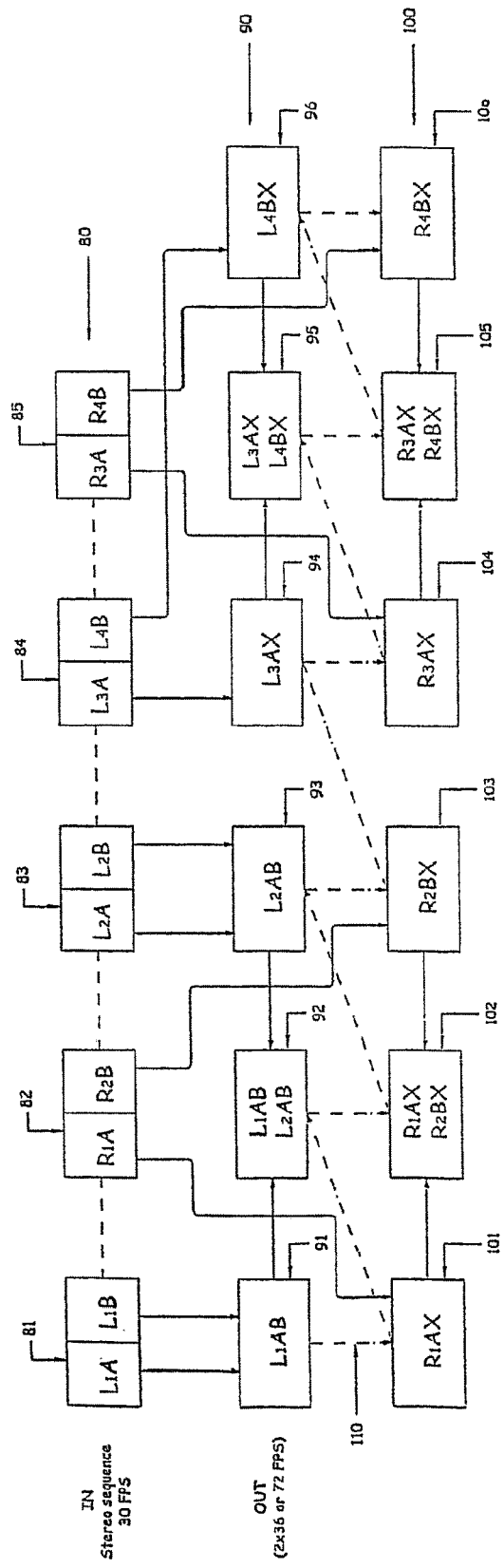

FIG. 4b illustrates how the compressed stereo sequence 80 can be decoded to provide two 36 fps streams, using a spatial and temporal interpolation.

Figure 5:
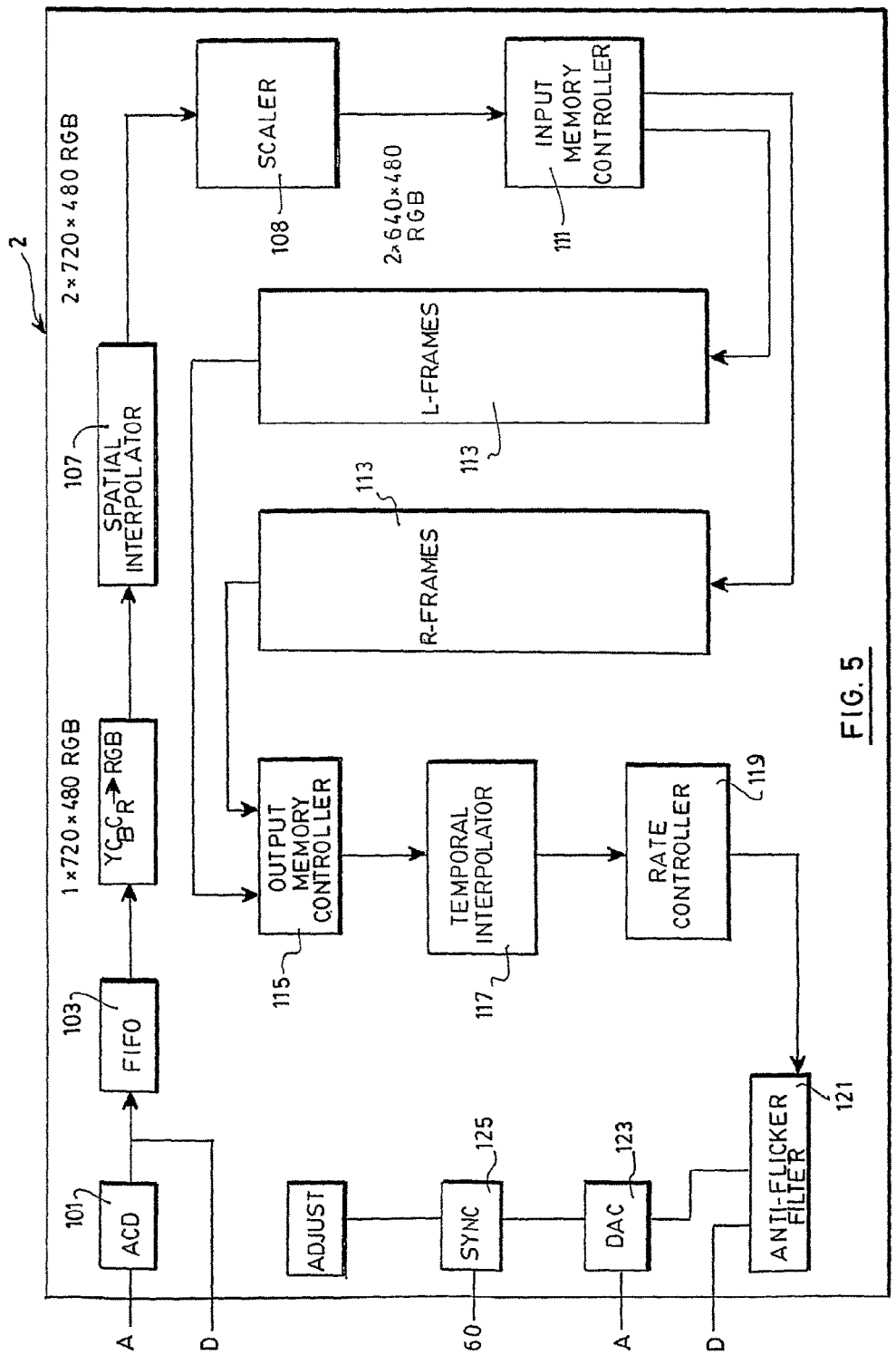
FIG. 5 is a schematic representation of a decoder according to a preferred embodiment of the invention.

A more specific representation of the decoder 2 of the present invention is shown in FIG. 5. However, it should be understood that variations are possible, depending, for example, on whether an all software, all hardware, or mixture of both, solution is chosen.

As can be seen, the decoder has two inputs: an analog and a digital. If the signal is analog, it is converted into a digital signal by ADC 101. FIFO buffer 103 changes the clock domain of the input signal into a clock domain used by the decoder. In practice, a broadcast signal or a DVD signal are clocked at a frequency different from the frequency used for RGB signals, hence the necessity of FIFO buffer 103. The signal is then passed through converter 105 which converts the signal from a Y $C_B$ $C_R$ signal into an RGB signal of 1×720×480 (pixels). This signal is then spatially interpolated according to the teachings of the present invention by spatial interpolator 107, resulting is a dual stream of 720×480 pixels. This dual stream is then scaled in scaler 109 to provide two 640×480 image streams (always in the RGB format). Alternatively, other resolutions can be supported by the system of the present invention. The frames are then placed in frame buffers 113, one for the right frames and the other for the left frames, the contents of which are controlled by input memory controller 111.

The output of the frame buffers is controlled by output memory controller 115 and, if necessary, time interpolator 117 to increase the frame rate.

A rate controller 119 is preferably provided. The purpose of rate controller is to accommodate variations in the clock signals, which variations, although minute, de-synchronise the system. Rate controller monitors the difference in rate and corrects the output frequency by adding or removing a certain number of pixels on inactive lines of the frame. For example, for a frame it may be necessary to add a few pixels to artificially slow the internal clock and to properly synchronise the clocks.

Another advantageous component of decoder 2 is the anti-flicker filter 121. Flicking occurs when wearing shutter spectacles, when there is a contrast between the image and the closing of the shutter of the head display. It has been surprisingly discovered that by evaluating the value of the green level in each RGB pixel, and by decreasing the corresponding pixel colours proportionally when the green level is above a certain value, flicking is greatly reduced.

The output is then directly digital, or converted into an analog signal by DAC 123. Sync module 125 synchronises the head display with the output signal in order to open and close the shutters at the appropriate times.

Further preferably, an adjuster 127 is further provided. This adjuster is useful when the display device includes its own frame buffer, which would otherwise result in a de-synchronisation between the sync signal for the shutters and the actual display. This is a manual adjustment that the user makes in order to reduce crosstalk/ghosting of the image.

A second embodiment of the mixing method carried out by mixer 1 according to the present invention will now be described in detail, by reference to FIG. 4a of the appended drawings. This second embodiment is particularly advantageous for addressing the problem of converting two image sequences available in a 24 fps format to produce a 30 fps MPEG2 (main view profile) fully compatible sequence.

Full definition images from the two 24 fps sequences 50 and 50' comprising mosaics A and B by definition are identified as $L_iAB$ and $R_iAB$ respectively (supposing two sequences of a stereoscopic program), index "i" representing the sequential number of a given image at time t. Dashed lines in FIGS. 4a and 4b indicate frame sequence. In a similar manner as for the first embodiment previously described, eight input images are spatially compressed and time-expanded to form five new merged images in a new 30 fps sequence 80. It should be noted that in this embodiment of the present invention, 25% more of the original image information is preserved to be recorded or broadcasted. Indeed, two out of the eight original images (images L1 and L2 in the example shown) have both of their mosaics A and B saved in fields of the compressed, sequence 80 instead of one according to the first embodiment.

These fully saved images are nevertheless encoded in the form of two complementary mosaics stored in side-by-side merged images fields to ascertain homogeneity of the encoded sequence and compatibility with the MPEG2 compression/decompression protocol, by providing a certain temporal redundancy between successive images. Better definition and fidelity is thus generally obtained at playback with respect to the previously described embodiment, but at the expense of increased processing power requirement and system hardware cost. As for the above-described first embodiment, the encoding (mixing) process according to the present embodiment of the invention also further includes insertion of information in the compressed sequence 80 to enable identification of frame numbers as needed by the reconstruction process to identify image content and rebuild sequences with the proper sequential order and insert interpolated images at appropriate locations in the sequence. Again, such information may be stored in blank lines of merged images for instance.

The corresponding decoding process carried out by decoder 2 according to the present invention is schematically represented in FIG. 4b and operates as follows.

The five merged frames 81 to 85 representative of 30 fps RGB input sequence 80 are expanded to twelve images (six per channel) providing playback sequences 90 and 100 at 36 fps total (72 total, 36 per eye in the case of a three-dimensional stereoscopic program). In total, each group of twelve successive images of playback sequences 90 and 100, presented in a page flipping mode according to the frame sequence indicated by dashed lines 110, comprises two integral original images, six spatially interpolated images and four temporally interpolated images. Alternatively, sequences 90 and 100 could be outputted separately in parallel on two separate channels, as required by some display devices such as a head mounted or auto-stereoscopic devices. In the illustrated example:

1. Image 91 ($L_1AB$) is totally rebuilt from mosaic $L_1A$ stored in the left field of frame 81 of sequence 80, and mosaic $L_1B$ stored in the right field thereof;
2. Image 101 ($R_1AX$) is spatially interpolated from mosaic $R_1A$, taken from the left field of frame 82 of sequence 80;
3. Image 103 ($R_2BX$) is spatially interpolated from mosaic R2B, taken from the right field of frame 82 of sequence 80;
4. Image 102 is temporally interpolated from image 101 and image 103;
5. Image 93 ($L_2AB$) is totally rebuilt from mosaic image L2A, stored in the left field of frame 83 of sequence 80, and mosaic $L_2B$ stored in the right field thereof
6. Image 92 is temporally interpolated from image 91 ($L_1AB$) and image 93 ($L_2AB$);
7. Image 94 ($L_3AX$) is spatially interpolated from mosaic $L_3A$, stored in the left field of frame 84 of sequence 80;
8. Image 96 ($L_4BX$) is spatially interpolated from mosaic $L_4B$, stored in the right field of frame 84 of sequence 80;
9. Image 95 is temporally interpolated from images 94 and 96; Image 104 ($R_3AX$) is spatially interpolated from mosaic $R_3A$, stored in the left field of frame 85 of sequence 80;
11. Image 106 ($R_4BX$) is spatially interpolated from mosaic $R_4B$, stored in the right field of frame 85 of sequence 80; and
12. Image 105 is temporally interpolated from image 104 and image 106.

Obviously, one may easily understand that such a reconstruction process requires proper identification of frame order in the 5 frame sequences constituting input sequence 80. Therefore, a frame recognition circuit is provided in decoder 2 to interpret frame number information stored by mixer 1 in merged image sequence 80.

It can be observed that in this latter embodiment as well as in the first one disclosed in the foregoing description, the first and second image sequences are being encoded and decoded totally independently, without any inference between each other, enabling processing of original video sequences referring to independent scenes.

The above described example of the second embodiment, processing sources at 24 fps to yield a presentation rate of 72 fps, is only illustrative of a more general process applicable to 24 or 30 fps sources to produce a stereo output at presentation rates such as 60, 72, 96 or 120 fps. The chart below provides additional exemplary arrangements for 24 or 30 fps sources and 60, 72, 96 or 120 fps presentation rates:

| Source (fps) | Output (fps) | Original images | Spatially-interpolated images | Temporally-interpolated images | Repeated images |
|---|---|---|---|---|---|
| 24 + 24 | 60 | 12 | 36 | 12 or 0 | 0 or 12 |
| 24 + 24 | 72 | 12 | 36 | 24 | 0 |
| 24 + 24 | 96 | 12 | 36 | 0 | 48 |
| 24 + 24 | 120 | 12 | 36 | 12 | 60 |

-continued

| Source (fps) | Output (fps) | Original images | Spatially-interpolated images | Temporally-interpolated images | Repeated images |
|---|---|---|---|---|---|
| 30 + 30 | 60 | 0 | 60 | 0 | 0 |
| 30 + 30 | 72 | 0 | 60 | 12 or 0 | 0 or 12 |
| 30 + 30 | 96 | 0 | 60 | 36 | 0 |
| 30 + 30 | 120 | 0 | 60 | 0 | 60 |

As stated above, RGB sequences 90 and 100 obtained through the above described processing could be directly outputted and displayed on a dual input device to reproduce the original programs or stereoscopic program signals at a 72 fps (36 per eye) presentation rate. Further processing is however carried out by decoder 2 to provide a combined stereoscopic RGB output signal (not shown) comprising images of sequences 90 and 100 in a time sequenced arrangement as indicated by dashed arrows such as 110. Still referring to the example of FIG. 4b, images would be time sequenced by alternating left eye and right eye images in the following order 91, 101, 92, 102, 92, 103, 94, 104, 95, 105, 96, 106. This is accomplished through an appropriate read sequence of the complete images stored in memory buffers.

Presentation of the time sequenced combined signal with a standard projector or another display device is thus enabled to display the stereoscopic program in a page-flipping mode. Decoder 2 provides the necessary timing signals to a driver of shutter spectacles which can be worn by a viewer to view the displayed stereoscopic program in a three-dimensional mode, with high fidelity, negligible flicking and high comfort. As stated above, presentation rate can be increased up to 120 fps by inserting additional temporally interpolated image pairs or by repeating certain image pairs in the decoding process. It is also contemplated in the present invention that the RGB combined stereo output signal could be converted to another known standard presentation format such as an interlaced format or a conventional 2D format.

Therefore, one can easily appreciate that the above described embodiments of the present invention provide effective and practical solutions for the recording of two motion picture sequences on a conventional data storage medium, and playback with conventional videodisk player or broadcast source and display device, to enable viewing of stereoscopic 3D movies at home with unmatched performance and comfort, still at an affordable cost, in a plurality of output modes to match input signal requirement of a broad range of display devices. For example a universal set top box fed with a single input signal format as defined in the foregoing description, can be provided with selectable modes such as: page flipping, row interleaved, column interleaved, simultaneous dual presentation, anaglyphic, etc. The encoding/playback method and system of the present invention can thus be advantageously used in miscellaneous applications, including the processing of video sequences representing independent scenes, with numerous advantages over the solutions of the prior art.

It will thus be readily appreciated that the present invention presents advantages over the prior art. It provides a better quality of images, since no frequency filters are used (low pass or band pass), decompression can be effected in real time with minimal resources, is compatible with progressive or interlaced systems, both at input and output, allows for pause, forward, reverse, slow, etc., and supports all stereoscopic displays presently available.

Although the present invention has been described by means of preferred embodiments thereof, it is contemplated that various modifications may be made thereto without departing from the spirit and scope of the present invention. Accordingly, it is intended that the embodiment described be considered only as illustrative of the present invention and that the scope thereof should not be limited thereto but be determined by reference to the claims hereinafter provided and their equivalents.

What is claimed is:

1. A method for displaying images, comprising:
   in a conventional two-dimensional (2D) viewing mode:
      driving a 2D image of a plurality of 2D images to a head mountable display; and
   in a stereoscopic three-dimensional (3D) viewing mode:
      driving to the head mountable display a left image of a plurality of left images for left eye viewing, wherein at least a portion of the plurality of left images are generated using time interpolation to increase a frame rate of the display, and a right image of a plurality of right images for right eye viewing, the left image and the right image being time-synchronized with parallax for perception of depth in the stereoscopic 3D viewing mode, wherein the driving comprises simultaneous dual presentation of the left image and the right image.

2. The method of claim 1, further comprising:
   in the stereoscopic 3D viewing mode, time interpolating the left image and another left image of the plurality of left images using movement anticipation.

3. The method of claim 1, further comprising:
   time-interpolating at least a portion of the plurality of left images to improve fluidity of playback.

4. The method of claim 1, wherein variations in clock signals are accommodated by a rate controller to avoid de-synchronization.

5. The method of claim 1, further comprising, in the stereoscopic 3D viewing mode:
   monitoring variations in clock signals; and
   correcting an output frequency to maintain synchronicity.

6. The method of claim 1, further comprising:
   proportionally decreasing colours of at least one pixel in the left image when at least one colour value of the at least one pixel is above a certain value to decrease flicking.

7. The method of claim 1, wherein the head mountable display is a first head mountable display, the method further comprising in the stereoscopic 3D viewing mode:
   driving one of the left image or the right image to a second non head mountable display for display in a conventional 2D viewing mode.

8. The method of claim 1, further comprising:
   receiving at least one image at a digital input over an internet connection.

9. The method of claim 1, wherein the driving includes an output frame frequency that is controlled by removing pixels from a left image or a right image.

10. A system comprising:
    an image buffer for storing image data; and
    an output controller for communicating with a head mountable display according to a plurality of viewing modes including a conventional two-dimensional (2D) viewing mode and a stereoscopic three-dimensional (3D) viewing mode, the output controller having access to the image buffer for reading data therein and for generating therefrom an output signal, wherein:
       in the conventional 2D viewing mode the output controller drives a 2D image of a plurality of 2D images to the head mountable display, and
       in the stereoscopic 3D viewing mode, the output controller drives a left image of a plurality of left images and a right image of a plurality of right images to the head mountable display, wherein at least a portion of the plurality of the left images are generated using time interpolation to increase a frame rate of the display, the left and right images being time-synchronized with parallax for perception of depth, wherein the driving comprises simultaneous dual presentation of the left image and the right image.

11. The system of claim 10, further comprising a temporal interpolator configured to, in the stereoscopic 3D viewing mode, time interpolate the left image and another left image of the plurality of left images using movement anticipation.

12. The system of claim 11, wherein the temporal interpolator is configured to time-interpolate at least a portion of the plurality of left images to improve fluidity of playback.

13. The system of claim 10, further comprising a rate controller configured to accommodate variations in clock signals to avoid de-synchronization.

14. The system of claim 10, further comprising a temporal interpolator and a rate controller, the rate controller being configured to, in the stereoscopic 3D viewing mode, monitor variations in clock signals and correct output frequency to maintain synchronicity.

15. The system of claim 10, further comprising an anti-flicker filter configured to decrease colours of at least one pixel in the left image proportionally when at least one colour of the at least one pixel is above a certain value to decrease flicking.

16. The system of claim 10, wherein the head mountable display is a first display, and wherein in the stereoscopic 3D viewing mode, the output controller drives one of the left image or the right image to a second display for display in a conventional 2D display mode.

17. The system of claim 10, further comprising a digital input connectable to the internet, the digital input configured to receive at least one image over an internet connection.

18. The system of claim 10, wherein the output controller controls a frequency of the output signal by removing pixels from a left image or a right image.

19. A method comprising:
    receiving stereoscopic three-dimensional (3D) images, the images including a left image of a plurality of left images and a right image of a plurality of right images, the left image and the right image being time-synchronized with parallax for perception of depth,
    topologically decimating at least a portion of the left image or the right image using a first pixel mosaic,
    reconstructing the topologically decimated left image or the topologically decimated right image using interpolation,
    driving a head mountable display wherein the driving comprises simultaneous dual presentation of the reconstructed left image and the reconstructed right image.

20. The method of claim 19, wherein the topologically decimating at least a portion of the left image or the right image using the first pixel mosaic and a second pixel mosaic.

* * * * *